(12) United States Patent
Huang et al.

(10) Patent No.: US 11,598,501 B2
(45) Date of Patent: Mar. 7, 2023

(54) DOWNLIGHT APPARATUS

(71) Applicant: XIAMEN LEEDARSON LIGHTING CO., LTD, Fujian (CN)

(72) Inventors: Huiyong Huang, Fujian (CN); Zhenyu Tang, Fujian (CN); Shuxing Gao, Fujian (CN); Yizhen Chen, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/411,731

(22) Filed: Aug. 25, 2021

(65) Prior Publication Data

US 2022/0065410 A1 Mar. 3, 2022

(30) Foreign Application Priority Data

Aug. 25, 2020 (CN) .......................... 202021801996.3

(51) Int. Cl.
| | |
|---|---|
| *F21S 8/02* | (2006.01) |
| *F21V 23/00* | (2015.01) |
| *F21V 23/04* | (2006.01) |
| *F21V 19/00* | (2006.01) |
| *F21V 21/03* | (2006.01) |
| *F21V 8/00* | (2006.01) |
| *F21Y 103/33* | (2016.01) |
| *F21Y 115/10* | (2016.01) |

(52) U.S. Cl.
CPC .......... *F21S 8/026* (2013.01); *F21V 19/0015* (2013.01); *F21V 21/03* (2013.01); *F21V 23/007* (2013.01); *F21V 23/04* (2013.01); *G02B 6/0088* (2013.01); *F21Y 2103/33* (2016.08); *F21Y 2115/10* (2016.08)

(58) Field of Classification Search
CPC ................................ F21S 8/026; F21V 21/03
See application file for complete search history.

(56) References Cited

U.S. PATENT DOCUMENTS

| | | | |
|---|---|---|---|
| 10,012,365 B2 * | 7/2018 | Feit ........................... | F21S 8/02 |
| 10,323,806 B1 * | 6/2019 | Li ........................... | F21V 15/01 |
| 11,029,005 B1 * | 6/2021 | Hsu ........................... | F21V 21/03 |
| 11,255,498 B2 * | 2/2022 | Van Winkle .......... | F21V 21/044 |
| 2017/0363261 A1 * | 12/2017 | White ................... | F21V 23/008 |

* cited by examiner

*Primary Examiner* — Matthew J. Peerce
(74) *Attorney, Agent, or Firm* — Chun-Ming Shih; Lanway IPR Services (57) ABSTRACT

A downlight apparatus includes a fixing bar, a driver box, a light container and a light source. The fixing bar has two elastic units and a central part. The two elastic units are located at two opposite sides of the central part. The two elastic units are deformed so as to pass through a central hole of a fixing plate and then are released to attach to the fixing plate. The fixing plate is fixed to a platform. The driver box includes a driver for converting an external power to a driving current. The light container has a top cover and a lateral wall. The fixing bar is fixed on the top cover protruding toward the central hole of the fixing plate. A bottom side of the driver box is placed on the central part.

16 Claims, 10 Drawing Sheets

DOWNLIGHT APPARATUS

FIELD

The present invention is related to a downlight apparatus, and more particularly related to a downlight apparatus with flexible settings.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to provide a light device with compact size while providing flexible configuration. Manufacturing cost may be saved via using common parts among different types of light devices.

Therefore, it is beneficial to provide a novel design to consider multiple factors while keeping the overall cost as low as possible.

SUMMARY

In some embodiments, a downlight apparatus includes a fixing bar, a driver box, a light container and a light source.

The fixing bar has two elastic units and a central part.

The two elastic units are located at two opposite sides of the central part.

The two elastic units are deformed so as to pass through a central hole of a fixing plate and then are released to attach to the fixing plate.

The fixing plate is fixed to a platform.

The driver box includes a driver for converting an external power to a driving current.

The light container has a top cover and a lateral wall.

The fixing bar is fixed on the top cover protruding toward the central hole of the fixing plate.

A bottom side of the driver box is placed on the central part.

The light source is placed inside the light container to receive the driving current to emit a light from a light opening of the light container.

In some embodiments, a top side of the driver box passes through the central hole of the fixing plate.

In some embodiments, the driver box has a bottom plate and a box.

The bottom plate is detachably connected to the box.

A top cover of the box has a slit for disposing a manual switch.

In some embodiments, the manual switch includes an inner part and an external part.

The external part conceals the inner part.

The box is made of metal material.

Heat of the light source is transmitted to the box via the top cover of the light container.

In some embodiments, the two elastic units respectively have a bending part, the two bending parts define a larger diameter than the central opening if the two elastic units are not pressed to deform.

In some embodiments, the top cover of the light container has multiple sets of installation holes for fixing to multiple corresponding fixing structure attaching to different platforms.

In some embodiments, a protruding edge is disposed on an inner surface of the lateral wall for attaching multiple types of light passing covers.

In some embodiments, the lateral wall defines the light opening.

A first light passing cover conceals the light opening.

A first diameter of the first light passing cover is smaller than a peripheral diameter of the lateral wall.

In some embodiments, the lateral wall defines the light opening.

A second light passing cover conceals the light opening.

The second light passing cover conceals a bottom of the lateral wall.

In some embodiments, the lateral wall defines the light opening.

A third light passing cover conceals the light opening.

The second light passing cover wraps a bottom and a part of exterior surface of the lateral wall.

In some embodiments, the light container has multiple light source holders for disposing different types of LED modules.

In some embodiments, multiple conductive paths are disposed in the light holder for electrically connecting the different types of LED modules to the driver respectively.

In some embodiments, the light source includes a light strip.

The light strip is bent as a ring attached to an inner side of the light container.

A light guide plate is placed in the light holder for guiding the light of the light source toward the light opening.

In some embodiments, the light strip is attached to the light container with heat conductive glue.

In some embodiments, the light source includes multiple light strips mounted with LED units.

The LED units are disposed facing to the light opening.

In some embodiments, the light source includes a light strip emitting a second light toward a peripheral area of the light opening.

In some embodiments, the lateral wall forms a circular shape.

In some embodiments, the lateral wall forms a polygonal shape.

In some embodiments, the top cover of the light container has a groove for placing a foam unit.

The foam unit is clipped by the top cover of the light container and the fixing plate.

In some embodiments, the downlight apparatus may also include a light passing cover for fixing the light source.

An electrode is placed on the lateral wall for electrically connecting the light source to the driver.

DETAILED DESCRIPTION

Figure 9:
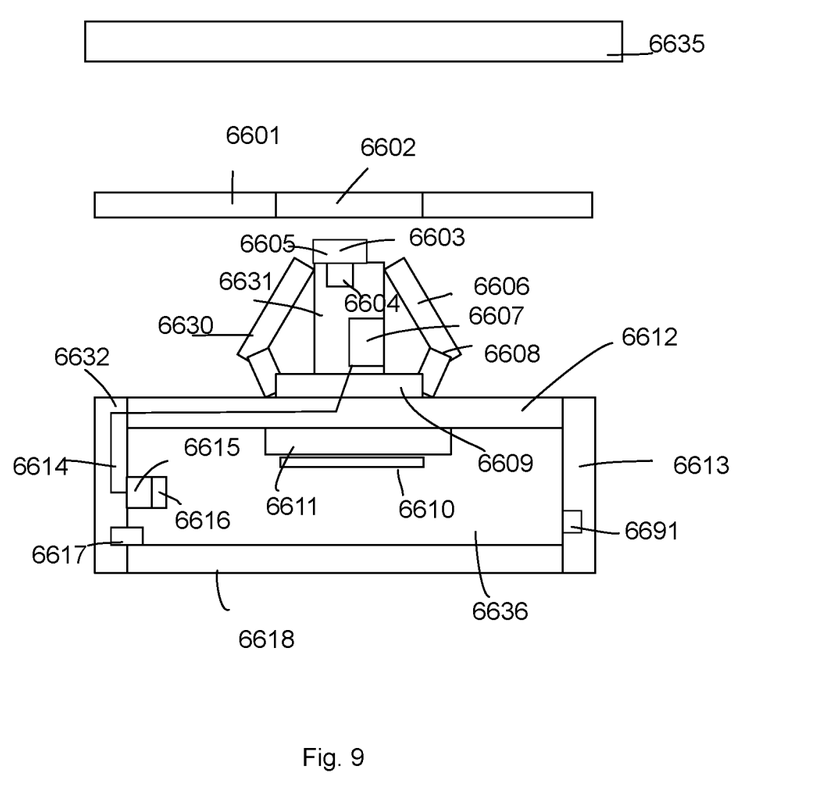
FIG. 9 illustrates another downlight apparatus embodiment.

Please refer to FIG. 9. A downlight apparatus includes a fixing bar 6630, a driver box 6631, a light container 6632 and a light source 6610.

The fixing bar 6630 has two elastic units 6606 and a central part 6609. In this example, the two elastic units 6606 are two symmetric elastic clips with a bending portion in the middle position. The fixing bar 6630 may be made of a single piece unit, e.g. by bending a metal bar to form the shape as illustrated.

The two elastic units 6606 are located at two opposite sides of the central part 6609.

The two elastic units 6606 are deformed so as to pass through a central hole 6602 of a fixing plate 6601 and then are released to attach to the fixing plate 6601. For example, users press the two elastic units 6606 to make the diameter defined by the two elastic units decreasing to pass through the central hole 6602. After the bending parts 6608, which form a largest diameter of the two elastic units 6606, pass through the central hole 6602, users release the two elastic units 6606 and the elastic units 6606 stay in the central hole 6602 for the bending parts of the elastic units 6606 engages the peripheral edge of the fixing plate 6601.

The fixing plate 6601 is fixed to a platform 6635, e.g. a ceiling or an installation plate on a ceiling or on a wall.

The driver box 6631 includes a driver 6607 for converting an external power to a driving current. The external power may be provided by adding a power wire from an inhouse power source. The driving current is not illustrated for it is invisible and is known by persons of ordinary skill in the art with the text description above.

The light container 6632 has a top cover 6612 and a lateral wall 6613.

The fixing bar 6630 is fixed on the top cover 6612 protruding toward the central hole 6602 of the fixing plate 6601.

A bottom side of the driver box is placed on the central part 6609 of the fixing bar 6630.

The light source 6610 is placed inside the light container 6632 to receive the driving current to emit a light from a light opening 6636 of the light container 6632.

In some embodiments, a top side of the driver box passes through the central hole 6602 of the fixing plate 6601.

Figure 5:
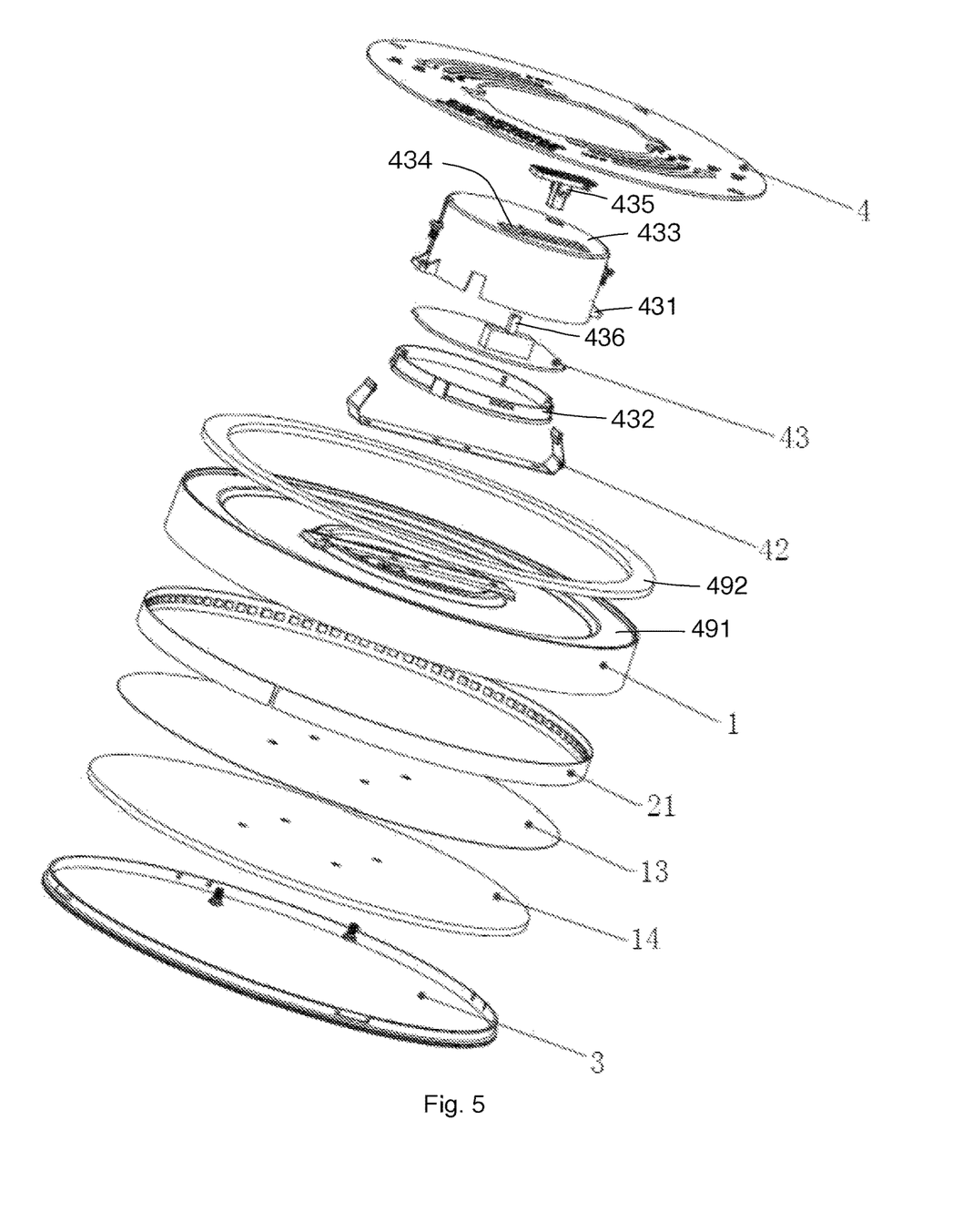
FIG. 5 illustrates an exploded view of a downlight apparatus.

In FIG. 5, the driver box has a bottom plate 432 and a box 431.

The bottom plate 432 is detachably connected to the box 431.

A top cover 433 of the box 431 has a slit 434 for disposing a manual switch.

In some embodiments, the manual switch includes an inner part 436 and an external part 435. The inner part 436 is mounted on a circuit board of the driver.

The external part 435 conceals the inner part 436, for safety and for preventing water or dust entering the driver box.

The box 531 is made of metal material.

Heat of the light source is transmitted to the box via the top cover of the light container.

In FIG. 9, the two elastic units 6630 respectively have a bending part 6608. The two bending parts 6608 define a larger diameter than the central opening 6602 if the two elastic units 6630 are not pressed to deform.

Figure 6:
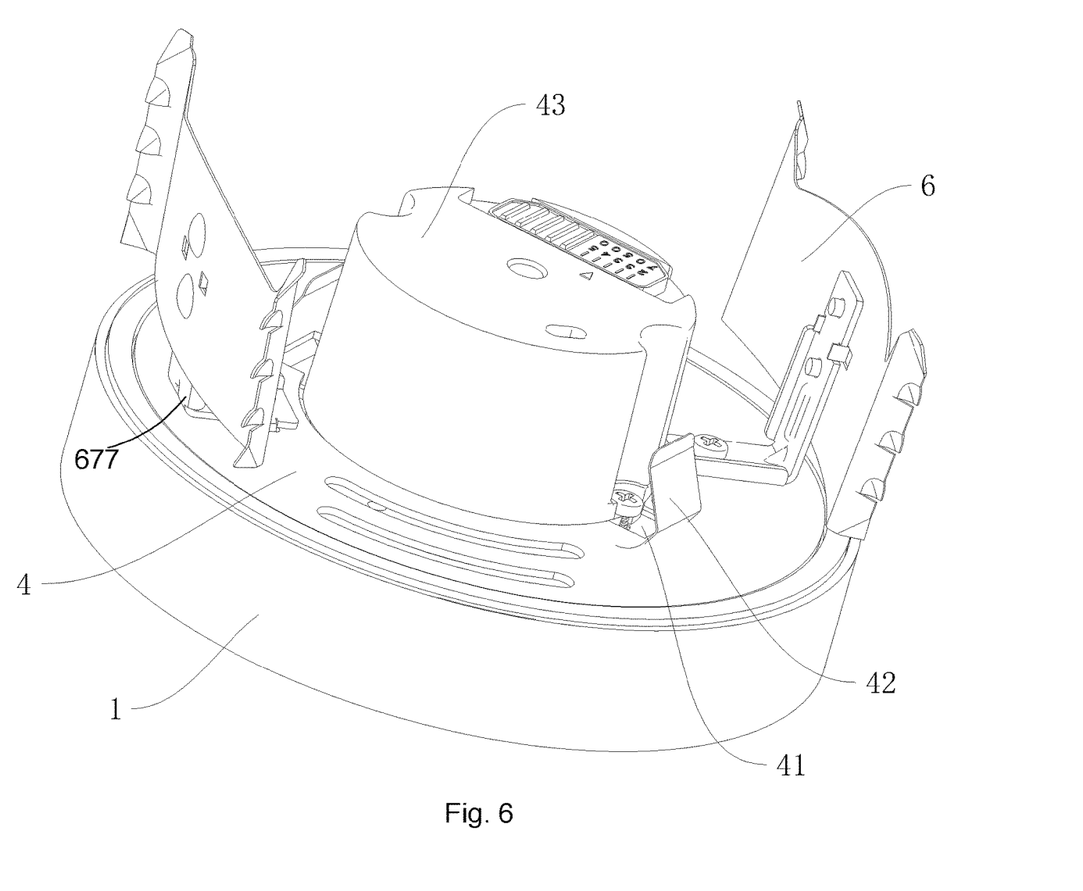
FIG. 6 illustrates a perspective view of a downlight example.
Figure 7:
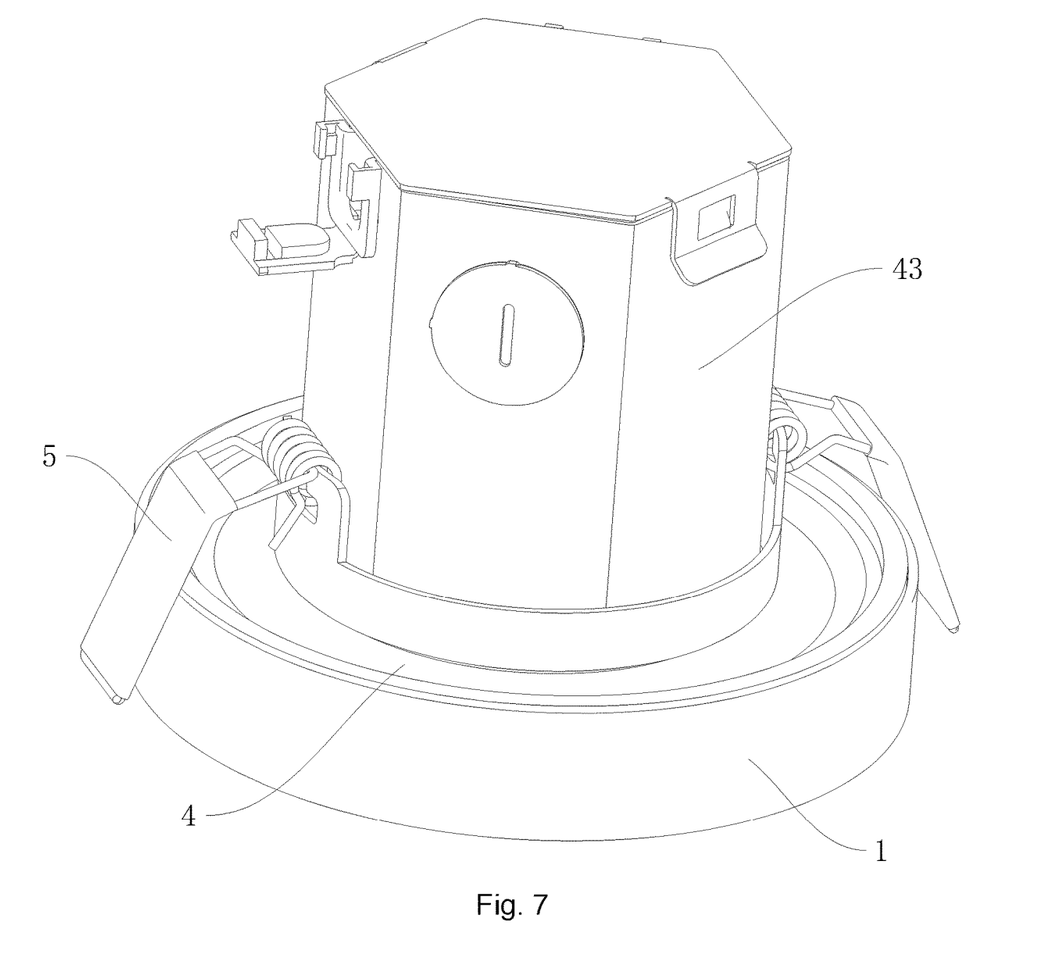
FIG. 7 illustrates a perspective view of another downlight example.

In some embodiments, the top cover of the light container has multiple sets of installation holes for fixing to multiple corresponding fixing structure attaching to different platforms. For example, FIG. 6 and FIG. 7 show two types of fixing structures are attached to the top cover of the light container via installation holes 677.

Figure 2:
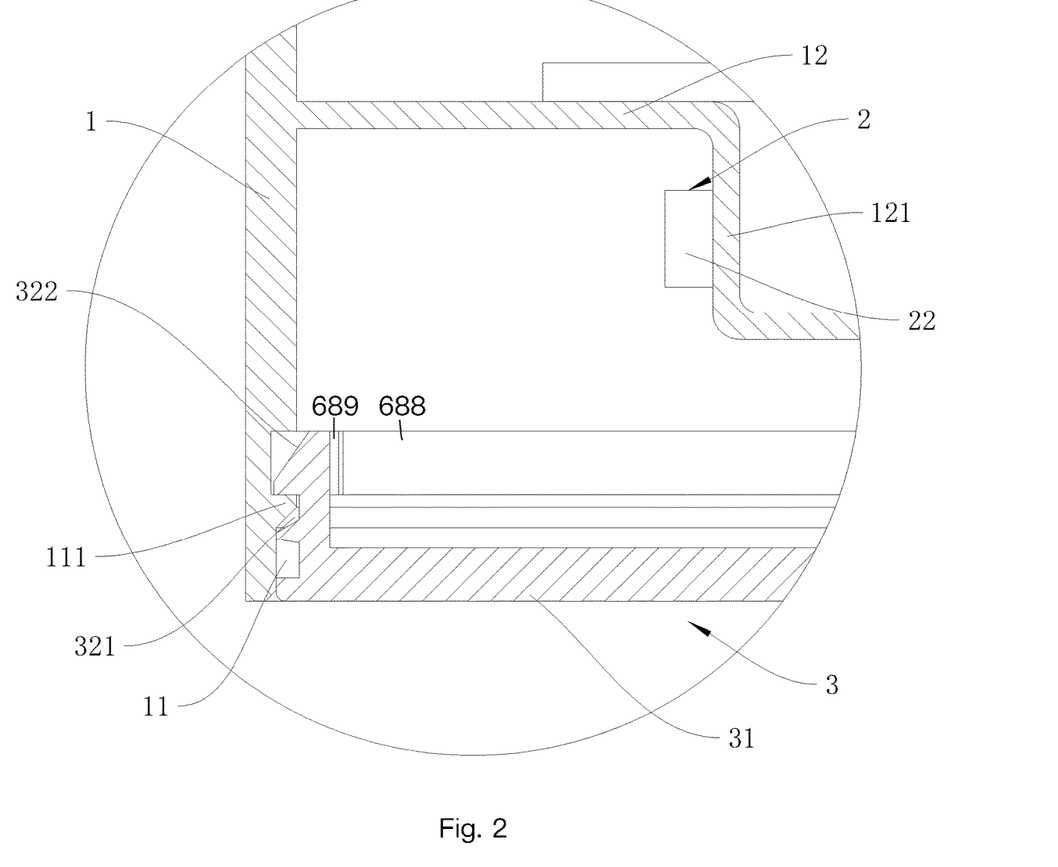
FIG. 2 illustrates a zoom-up view of a connection area of components in the example of FIG. 1.
Figure 3:
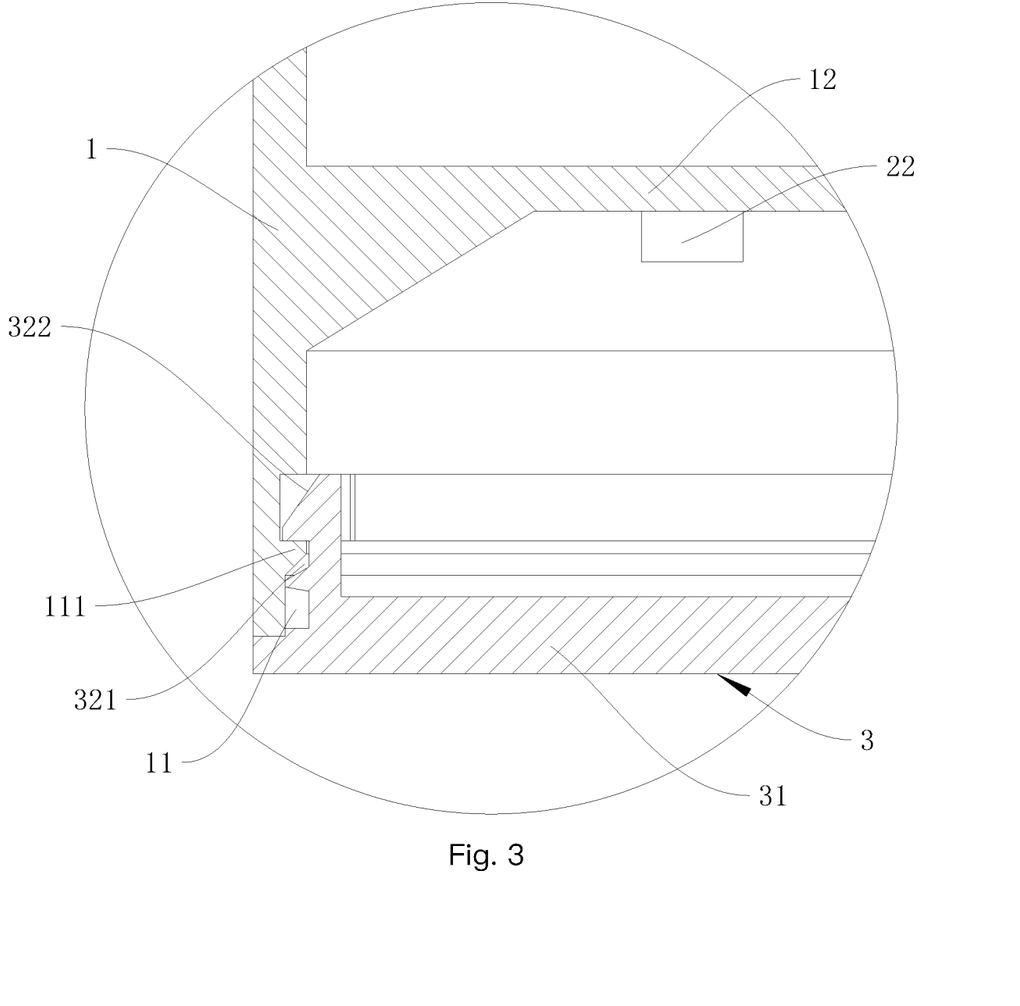
FIG. 3 illustrates another zoom-up view of a connection area of components in another example.
Figure 4:
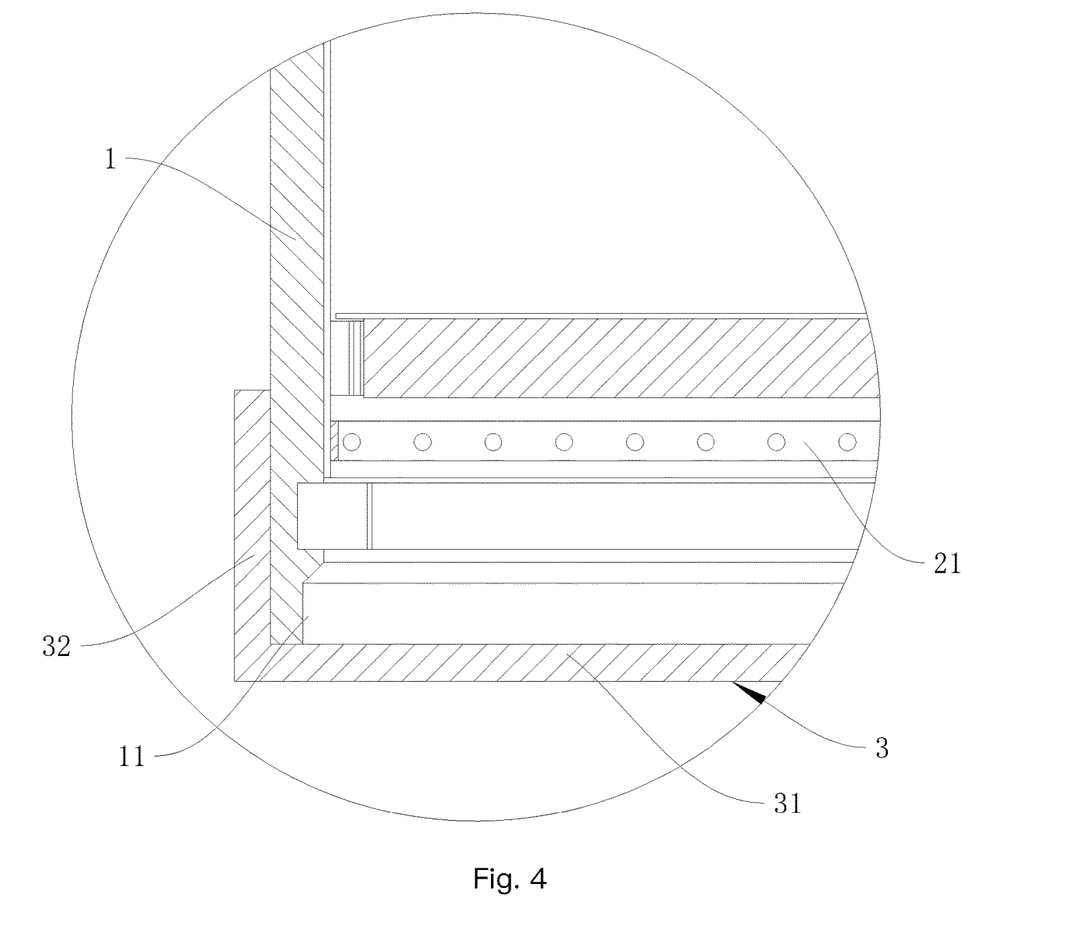
FIG. 4 illustrates another zoom-up view of a connection area of components in another example.

In FIG. 9, a protruding edge 6615 is disposed on an inner surface of the lateral wall 6613 for attaching multiple types of light passing covers. FIG. 2, FIG. 3 and FIG. 4 show three different types of light passing covers to mount via the same protruding edge structure.

In some embodiments, the lateral wall defines the light opening.

A first light passing cover conceals the light opening, as illustrated in FIG. 2.

A first diameter of the first light passing cover is smaller than a peripheral diameter of the lateral wall.

In some embodiments, the lateral wall defines the light opening.

A second light passing cover conceals the light opening, as illustrated in FIG. 3.

The second light passing cover conceals a bottom of the lateral wall.

In some embodiments, the lateral wall defines the light opening.

A third light passing cover conceals the light opening.

The second light passing cover wraps a bottom and a part of exterior surface of the lateral wall, as illustrated in FIG. 3.

In FIG. 9, the light container has multiple light source holders 6611, 6615 for disposing different types of LED modules.

In some embodiments, multiple conductive paths 6614 are disposed in the light holder 6611, 6615 for electrically connecting the different types of LED modules to the driver 6607 respectively.

In FIG. 9, the light source includes a light strip 6616.

The light strip 6616 is bent as a ring attached to an inner side of the light container 6632.

In FIG. 2, a light guide plate 688 is placed in the light holder for guiding the light of the light source toward the light opening.

In FIG. 2, the light strip is attached to the light container with heat conductive glue 689.

In some embodiments, the light source includes multiple light strips mounted with LED units.

The LED units are disposed facing to the light opening.

In FIG. 9, the light source includes a light strip 6691 emitting a second light toward a peripheral area of the light opening.

In some embodiments, the lateral wall forms a circular shape, e.g. a circular shape downlight.

In some embodiments, the lateral wall forms a polygonal shape, e.g. a rectangular shape downlight.

In FIG. 5, the top cover of the light container has a groove 491 for placing a foam unit 492.

The foam unit 492 is clipped by the top cover of the light container and the fixing plate.

Figure 10:
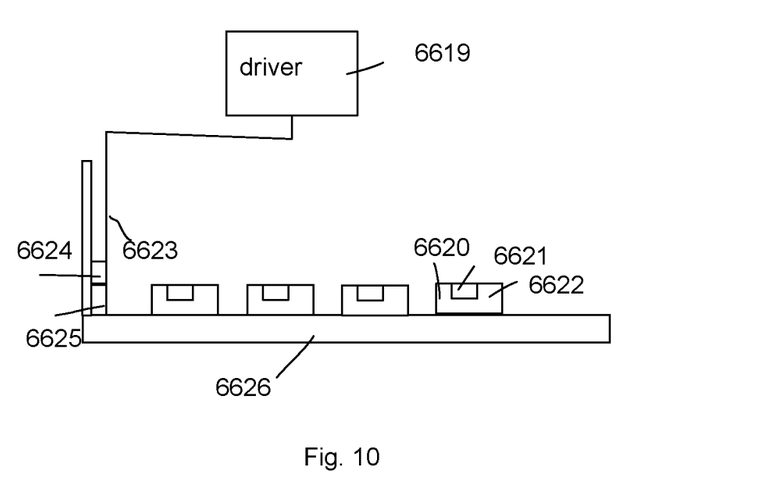
FIG. 10 illustrates a light passing cover mounted with LED units.

In FIG. 10, the downlight apparatus may also include a light passing cover 6626 for fixing the light source that has multiple LED modules 6620. Each LED module may include a LED chip 6621 and a lens 6622 for diffusing the light of the LED chip 6621.

An electrode 6624 is placed on the lateral wall for electrically connecting a corresponding electrode 6625 the light source to the driver 6619 via a conductive path 6623.

Figure 1:
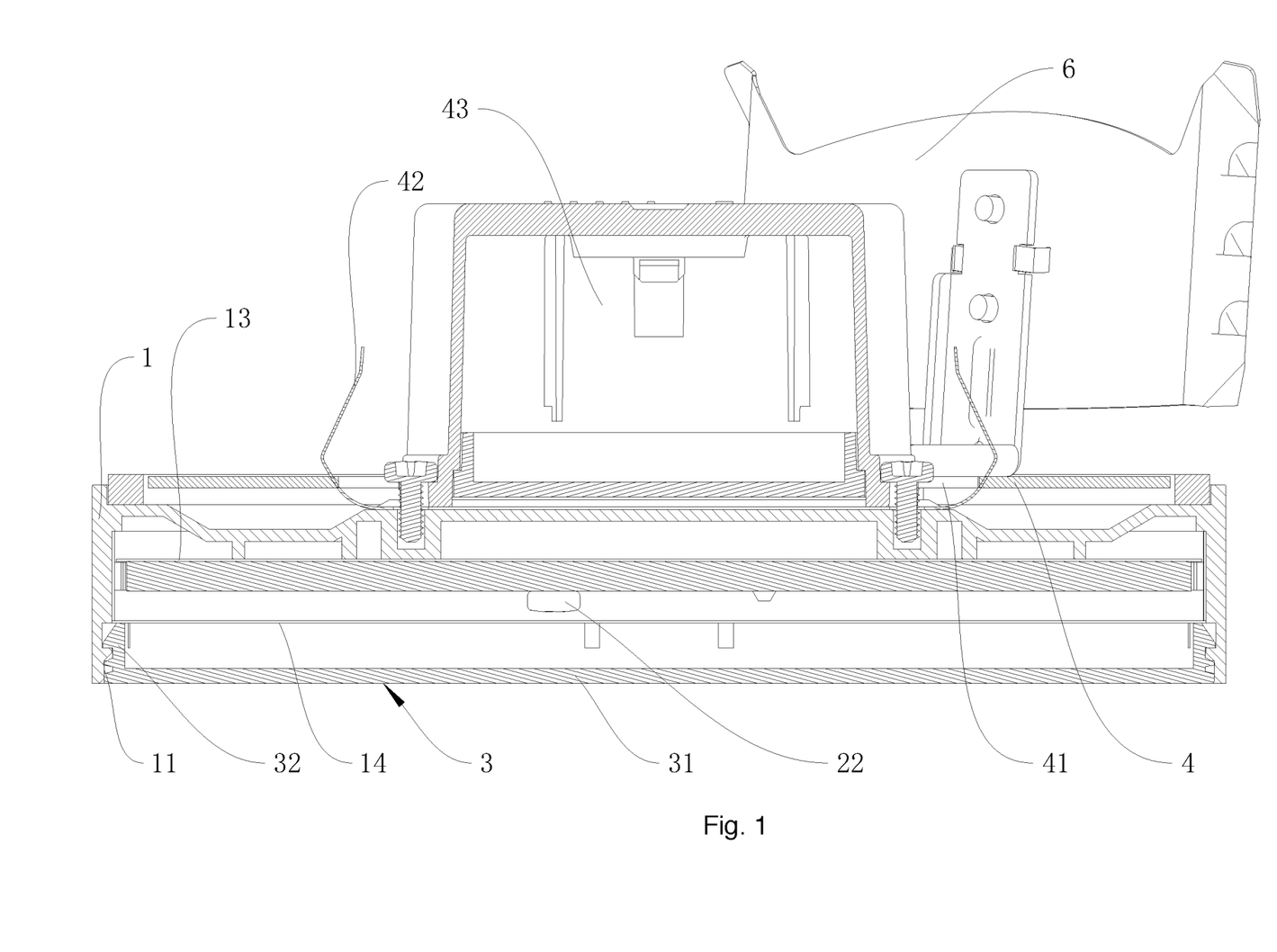
FIG. 1 illustrates a cross sectional view of a downlight embodiment.

Please refer to FIG. 1, which shows another embodiment.

In FIG. 1, the downlight apparatus includes a clip 6 for fixing to a platform, e.g. an European standard installation box. A driver 43 is used for converting an external power to a driving current. The light strip 22 may include multiple types of LED modules with different color temperatures so that the driver 43 may control the driving current to mix a desired color temperature with multiple types of the LED modules.

There is a light guide plate 14. A protruding edge 11 is used for attaching the light passing cover 32. The light container 1 is added with a reflective paper 13 for reflecting light to the light opening. The fixing plate 4 is used for fixing to the platform. There is a fixing hole 41 for connecting components. The light passing cover 32 has different areas for passing lights. There are elastic units 42 as mentioned above to attach the light container 1 to the fixing plate 4.

Please refer to FIG. 2, which shows a zoom-up view of a connection type. Reference numerals among different drawings refer to the same components if they have the same values. Thus, for brevity, they are not repeated unless necessary.

In FIG. 2, in addition to the description for FIG. 1, the light passing cover 3 has a corresponding buckle structure 111 to be attached to the light container 1. In this example, the light source 2 emits a light to a peripheral area of the light passing to increase overall light area and to make a better overall visual effect of the light device. The light source 2 has LED chips 22 mounted on a protruding part 121 of a plate 12.

FIG. 3 shows a different light passing cover 3 and different positions for placing LED chips 22.

FIG. 4 shows another type of light passing cover 3, as mentioned above. In other words, the same light container may be used for fitting different types of light passing covers to decrease the overall manufacturing cost.

FIG. 5 shows an exploded view of an embodiment.

The driver 43 passes through a central hole of the fixing plate 4. There is a fixing bar 42 with two elastic units as mentioned above. A light strip 21 is bent as a ring attached to an inner side of the light container 1. A reflective paper 13 is used for increasing light efficiency. The light guide plate 14 guides light of the light strip 21 to pass through the light passing cover 3.

FIG. 6 shows a way for fixing to a first platform. The elastic clips 42 is installed on an installation hole 41 of the top cover of the light container. The driver 43 is placed in a driver box passing through a central hole of a fixing plate.

FIG. 7 shows another way to fix the downlight apparatus to another platform. In FIG. 7, a spring 5 is used for fixing to the fixing plate 4.

Figure 8:
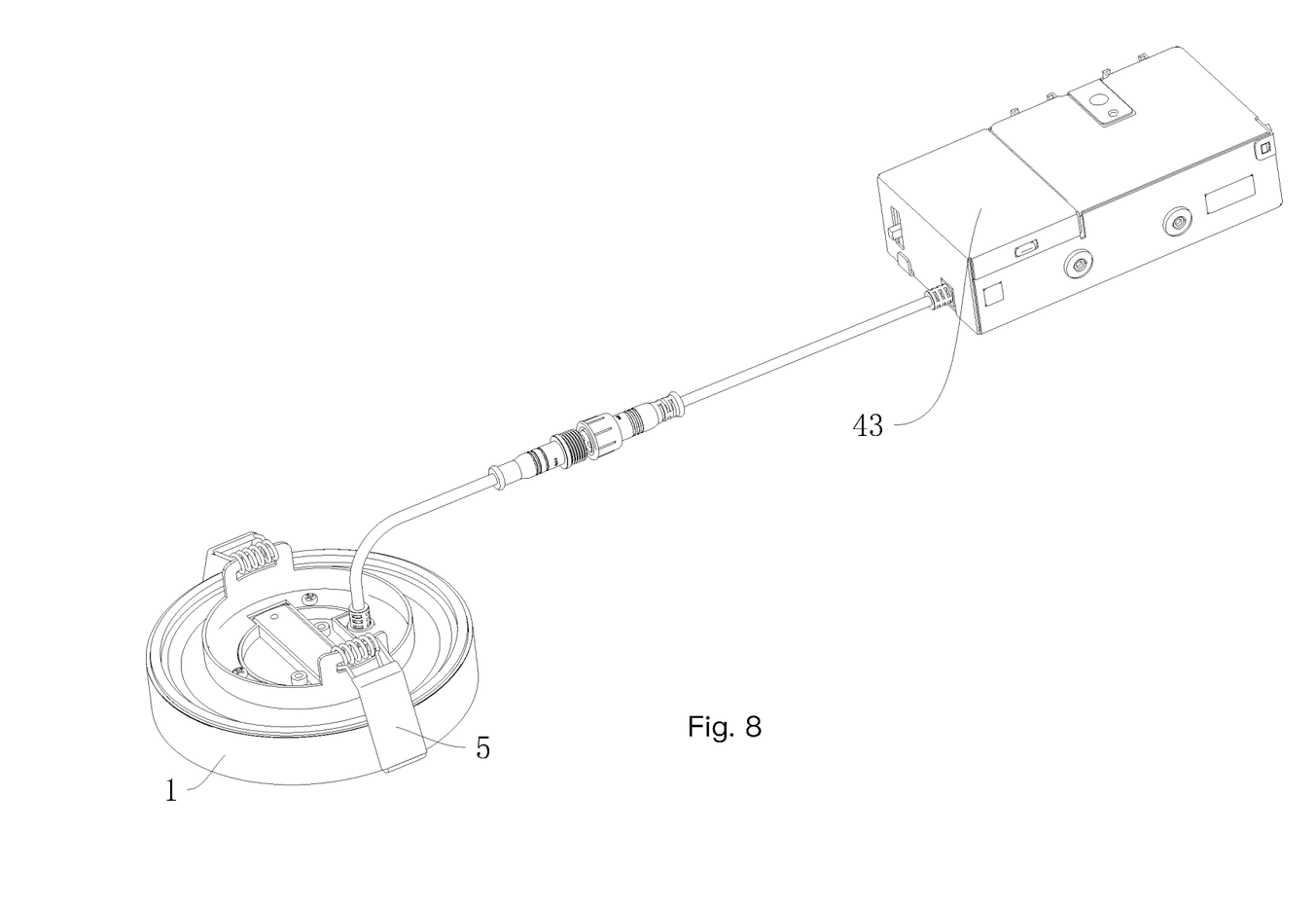
FIG. 8 illustrates a perspective view of another downlight example.

FIG. 8 shows another embodiment where the driver 43 is connected to the light container 1 via a connecting wire.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus, comprising:
a fixing bar with two elastic units and a central part, wherein the two elastic units are located at two opposite sides of the central part, wherein the two elastic units are deformed so as to pass through a central hole of a fixing plate and then are released to attach to the fixing plate, wherein the fixing plate is fixed to a platform;
a driver box comprising a driver for converting an external power to a driving current;
a light container with a top cover and a lateral wall, wherein the fixing bar is fixed on the top cover protruding toward the central hole of the fixing plate, wherein a bottom side of the driver box is placed on the central part; and
a light source placed inside the light container to receive the driving current to emit a light from a light opening of the light container, wherein a protruding edge is disposed on an inner surface of the lateral wall for selectively attaching one of at least two types of light passing covers, wherein the at least two types of light passing covers comprise a first light passing cover and a second light passing cover, wherein the lateral wall defines the light opening, wherein the first light passing cover conceals the light opening, wherein a first diameter of the first light passing cover is smaller than a peripheral diameter of the lateral wall, wherein the second light passing cover conceals the light opening, wherein the second light passing cover conceals a bottom of the lateral wall.

2. The downlight apparatus of claim 1, wherein a top side of the driver box passes through the central hole of the fixing plate.

3. The downlight apparatus of claim 2, wherein the driver box has a bottom plate and a box, wherein the bottom plate is detachably connected to the box, wherein a top cover of the box has a slit for disposing a manual switch.

4. The downlight apparatus of claim 3, wherein the manual switch comprises an inner part and an external part, wherein the external part conceals the inner part, wherein the box is made of metal material, wherein heat of the light source is transmitted to the box via the top cover of the light container.

5. The downlight apparatus of claim 1, wherein the two elastic units respectively have a bending part, the two bending parts define a larger diameter than the central opening if the two elastic units are not pressed to deform.

6. The downlight apparatus of claim 1, wherein the top cover of the light container has multiple sets of installation holes for fixing to multiple corresponding fixing structure attaching to different platforms.

7. The downlight apparatus of claim 1, wherein the at least two types of light passing covers further comprises a third light passing cover, wherein the third light passing cover conceals the light opening, wherein the third light passing cover wraps a bottom and a part of exterior surface of the lateral wall.

8. The downlight apparatus of claim 1, wherein the light container has multiple light source holders for disposing different LED modules to emit different lights to different directions.

9. The downlight apparatus of claim 8, wherein multiple conductive paths are disposed in the light container for electrically connecting the different types of LED modules to the driver respectively.

10. The downlight apparatus of claim 8, wherein the light source comprises a light strip, wherein the light strip is bent as a ring attached to an inner side of the light container, wherein a light guide plate is placed in the light holder for guiding the light of the light source toward the light opening.

11. The downlight apparatus of claim 10, wherein the light strip is attached to the light container with heat conductive glue.

12. The downlight apparatus of claim 8, wherein the light source comprises multiple light strips mounted with LED units, wherein the LED units are disposed facing to the light opening.

13. The downlight apparatus of claim 8, wherein the light source comprises a light strip emitting a second light toward a peripheral area of the light opening.

14. The downlight apparatus of claim 1, wherein the lateral wall forms a circular shape.

15. The downlight apparatus of claim 1, wherein the lateral wall forms a polygonal shape.

16. The downlight apparatus of claim 1, wherein the top cover of the light container has a groove for placing a foam unit, wherein the foam unit is clipped by the top cover of the light container and the fixing plate.

* * * * *